March 22, 1932. F. MÜNZINGER 1,850,133
LONG DISTANCE CONDUIT FOR CONVEYING FLUID AT HIGH PRESSURE
Filed July 31, 1931
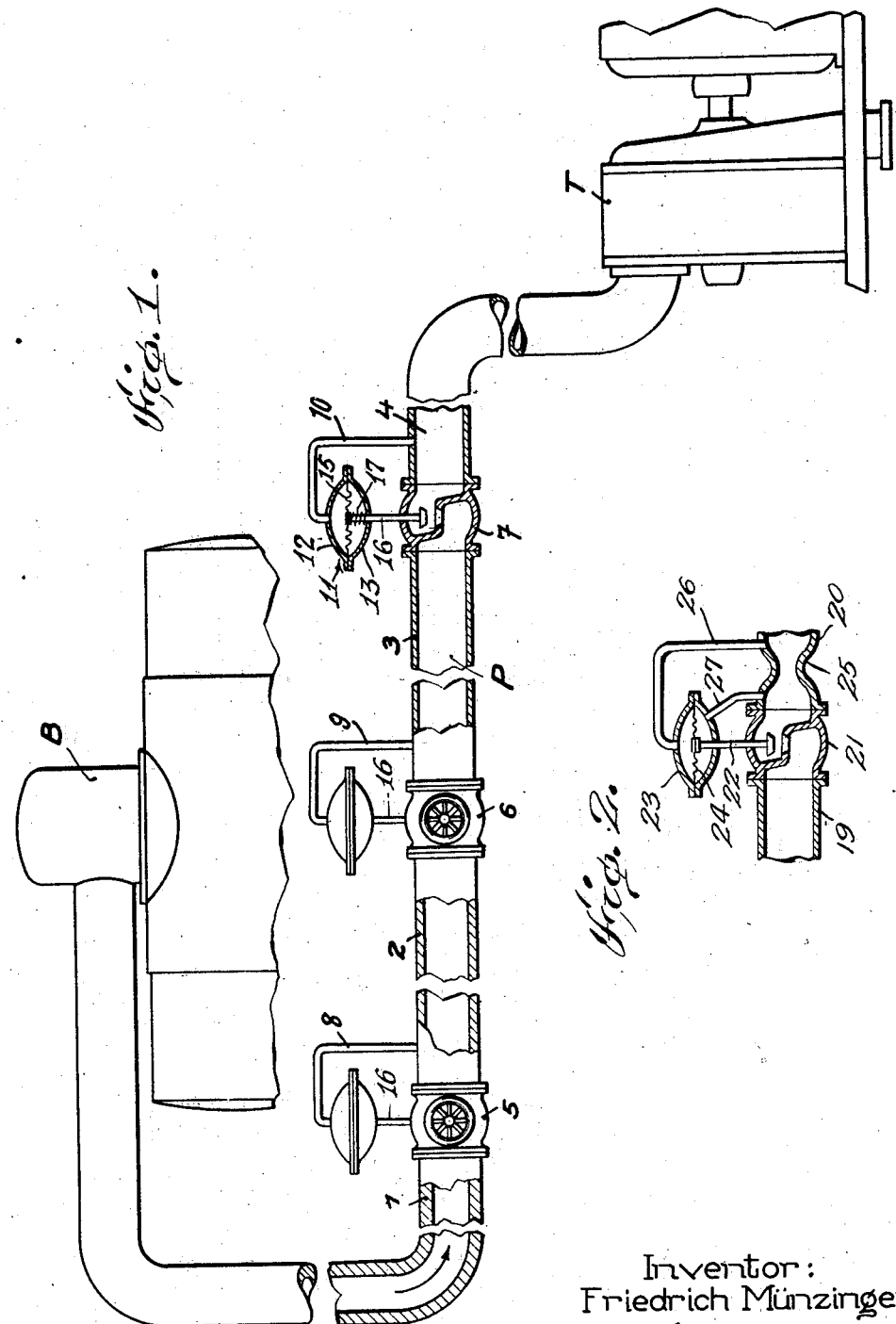
Inventor:
Friedrich Münzinger,
by Charles E. Tullar
His Attorney.

Patented Mar. 22, 1932

1,850,133

UNITED STATES PATENT OFFICE

FRIEDRICH MÜNZINGER, OF BERLIN, GERMANY

LONG DISTANCE CONDUIT FOR CONVEYING FLUID AT HIGH PRESSURE

Application filed July 31, 1931, Serial No. 554,363, and in Germany June 10, 1930.

My invention relates to long distance conduits for conveying fluid at high pressure such as pipes used in connection with electric power generating plants. In some cases, for instance in plants designed to feed electric power to a thickly populated district having high peak loads as in large cities, it is advisable to locate the boiler plant in an outer district and to supply live steam through long distance pipes or conduits to turbo-generators or like consumers arranged in close proximity of the area of consumption. In such cases efficient working of the plant can be obtained even with pipes measuring 5 to 10 kilometers in length and with pressure losses in the pipe of 20–60 atms.

Now at peak loads the drop of pressure in the pipe is relatively high so that at the end of the pipe the pressure is considerably lower than at the entrance. At small loads the drop of pressure in the pipe is relatively small so that in this case the pressure at the end of the pipe is only slightly lower than the pressure at the entrance. These circumstances appear to render it necessary to design the entire conduit for high pressure.

I avoid this drawback by subdividing the pipe into sections whose resistivity to pressure corresponds substantially to the distribution of pressure at full load and by providing pressure reducing means such as valves between the sections which control the pressure in these sections in such manner that the pressure at partial loads does not exceed the corresponding values ocurring at full loads.

In a preferred embodiment of my invention the valves are automatically operated, for instance in response to the rate of flow of fluid through said pipe or the steam pressure existing in the corresponding pipe sections.

In Fig. 1 of the drawings affixed to this specification and forming a part thereof an embodiment of my invention is shown diagrammatically by way of example partly in section, and Fig. 2 illustrates a modification according to my invention.

In the drawings B is a steam boiled and T a turbo-generator which are connected with each other by a long distance pipe P. This pipe is subdivided into consecutive sections 1, 2, 3, 4 of different resistivity to inner pressure. For instance section 1 may be designed for a pressure of 80 atms., section 2 for 60 atms., section 3 for 40 atms., section 4 for 20 atms. 5, 6, 7 are pressure reducing means such as throttle valves arranged between the sections 1, 2, 3 and 4 respectively. 8, 9, 10 are controlling means of a well known kind which regulate the opening of the valves in response to the pressure within the next succeeding section.

The operation of this device is as follows:

Steam produced in the boiler B is supplied through the pipe P to the turbo-generator T. At peak values the reducing valves 5, 6, 7 are fully open so that they do not reduce the pressure of the flowing steam. However since at peak values a large drop of pressure occurs in the pipe, for instance from 80 atms. in section 1 to 20 atms. in section 4, in sections 2 and 3 the pressures at peak load are 60 and 40 atms., respectively. At normal or at small loads the reducing valves are operated by means of the controlling devices 8—10 in such manner that the pressures in the sections 2, 3, 4 cannot exceed the values occurring at peak loads. Since at peak loads the largest quantity of steam flows through the pipe, the valve-controlling means 8—10 may be operated in response to the rate of flow of fluid through the pipe or conduit so that they close the valves in response to the decrease in demand for steam or like fluid. Owing to the provision of the reducing valves it is not necessary to design the pipe as a whole for the maximum pressure occurring at the entrance of the pipe, but the pipe can be subdivided in consecutive sections of decreasing strength so that the costs of the pipe are considerably reduced.

In the present instance I have shown the reducing valves 5, 6 and 7 as being regulated in terms of pressure existing in the inlet of the succeeding section as regards the direction of flow of fluid. For this purpose I provide pressure responsive devices 11, each of which comprises a casing having two halves 12 and 13 which are separated by a diaphragm 15. The latter is connected to the movable valve members 16 which normally are forced in an opening direction by the arrangement of a spring 17 between the diaphragm and the lower casing half. The upper half of the casings is connected by means of conduits 8, 9 and 10 to the inlet of the succeeding conduit sections as regards the direction of the flow of fluid.

The operation of this arrangement is as follows: Let us assume that the consumer T operates under maximum load. If now the demand of fluid, such as elastic fluid, decreases, owing for instance to a decreased load of the turbo-generator, it will cause a building-up of pressure in the conduit. This effects an increase of pressure in the upper casing halves of the fluid responsive devices, resulting in a closing movement of the movable valve members whereby the original pressure is maintained substantially constant. It will be readily seen that an opening movement of the valves takes place if the demand for elastic fluid increases.

In Fig. 2 I have shown a modification according to my invention for regulating the pressure reducing means in terms of flow of elastic fluid through the conduit, that is, in response to the demand for elastic fluid. 19 and 20 represent the end portions of two successive conduit sections. 21 is a valve casing for connecting the sections in series. The valve member 22 is regulated by a pressure responsive device 23 including a diaphragm 24 to which member 22 is fastened. For moving valve member 22 in response to the flow of fluid I may provide one conduit with a restriction, in the present instance indicated at 25, with respect to conduit section 20 and connect the upper and lower half of casing 23 by means of pipes 26 and 27 respectively with the two sides of the restriction. Flow responsive devices of this kind are well known in the art. In the present instance the arrangement operates to cause opening of the valve if the demand for fluid and accordingly the flow of fluid through the conduit increases and closing of the valve if the flow decreases.

Instead of subdividing the pipe into four sections as described above, it may be subdivided into a greater or lesser number of sections, as the case may be.

I wish it to be understood that I do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A long distance conduit for conveying fluid at high pressure comprising sections of different strength and pressure reducing valves arranged between said sections.

2. A long distance conduit for conveying fluid at high pressure comprising sections of different strength, pressure reducing valves arranged between said sections and means for controlling said valves.

3. A long distance conduit for conveying fluid at high pressure comprising sections of different strength, pressure reducing valves arranged between said sections, and means for controlling said valves automatically in response to the rate of flow of fluid through said conduit.

4. A long distance conduit for conveying fluid at high pressure comprising sections of different strength and pressure reducing valves arranged between said sections, said valves being arranged to reduce the pressure in said sections at partial loads to the values occurring at full load.

5. A long distance conduit for conveying fluid at high pressure comprising sections of different strength, pressure reducing valves arranged between said sections, and automatically operative means for controlling said valves in such manner that the pressures in said sections at partial loads cannot exceed the values occurring at full load.

6. In combination with a fluid consumer, a conduit of relatively considerable length for conveying fluid to the consumer, said conduit being divided into a plurality of sections of decreasing strength as regards the direction of flow, valve means provided between consecutive sections, and means for regulating the valve means in terms of fluid conditions.

7. In combination with a fluid consumer, a conduit of relatively considerable length for conveying fluid to the consumer, said conduit being divided into a plurality of sections of decreasing strength as regards the direction of flow, valve means provided between consecutive sections, and pressure responsive devices for regulating the valve means in order to maintain substantially constant the fluid pressure at the inlet of each section.

8. A long distance conduit for conveying fluid at high pressure comprising a first section through which the fluid enters and a second section of less strength than the first section to which the fluid is conveyed from the first section, and means for regulating the flow of fluid from the first section to the second section for preventing the pressure in the second section from increasing at partial load beyond the pressure existing in the second section at full load.

In testimony whereof I affix my signature.

FRIEDRICH MÜNZINGER.